April 28, 1925.
Re. 16,056
E. A. TERRELL
BOBBIN CLEANER
Original Filed Dec. 18, 1920 6 Sheets-Sheet 1
Fig. 2.
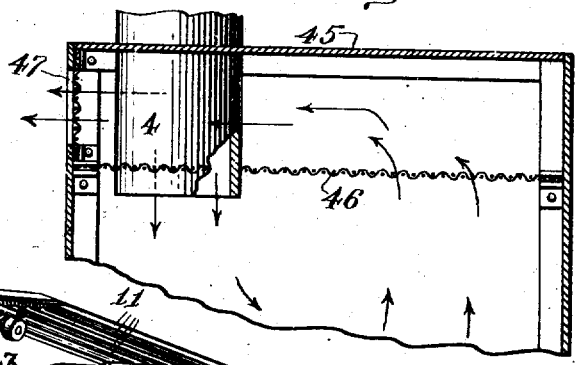
Fig. 1.
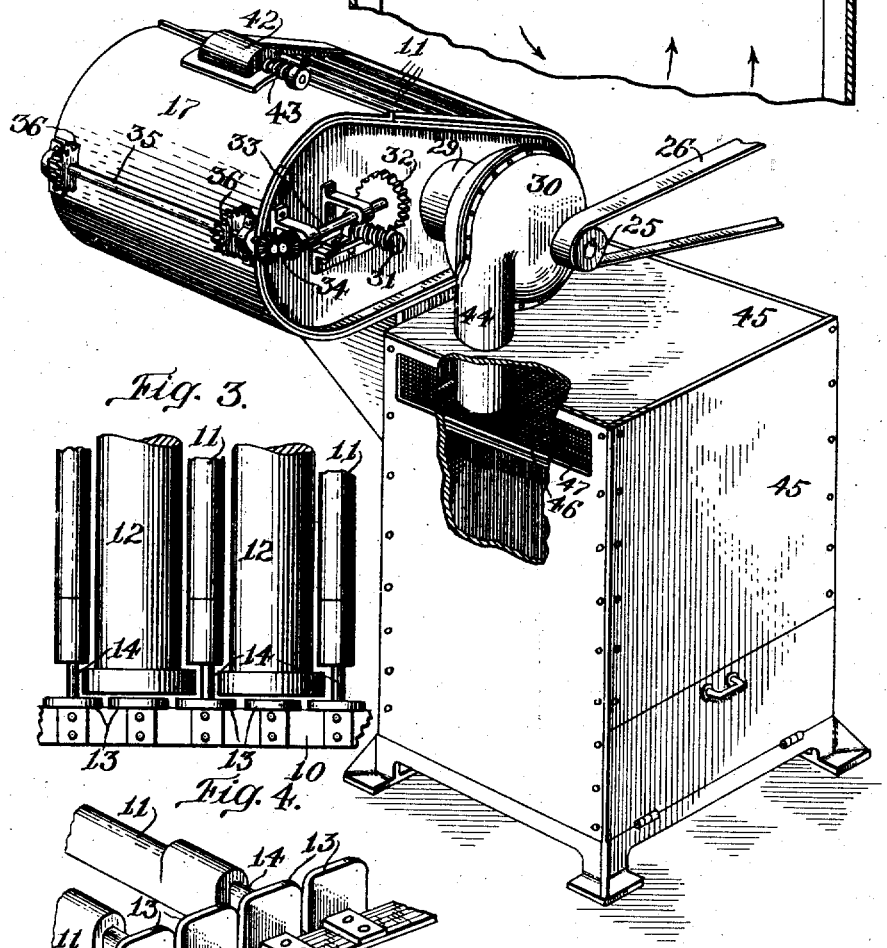
Fig. 3.
Fig. 4.
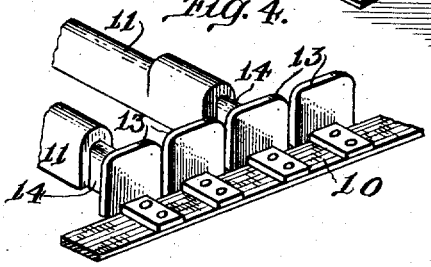
Inventor:
Edgar A. Terrell
by Chas. F. Randall
Attorney April 28, 1925. Re. 16,056

E. A. TERRELL

BOBBIN CLEANER

Original Filed Dec. 18, 1920 6 Sheets-Sheet 2

Inventor:
Edgar A. Terrell
by Chas. F. Randall
Attorney

April 28, 1925.

Re. 16,056

E. A. TERRELL

BOBBIN CLEANER

Original Filed Dec. 18, 1920 6 Sheets-Sheet 3

Inventor:
Edgar A. Terrell
by Chas. F. Randall
Attorney

April 28, 1925. Re. 16,056

E. A. TERRELL

BOBBIN CLEANER

Original Filed Dec. 18, 1920 6 Sheets-Sheet 4

Inventor:
Edgar A. Terrell
by Chas. F. Randall
Attorney

April 28, 1925.

Re. 16,056

E. A. TERRELL.

BOBBIN CLEANER

Original Filed Dec. 18, 1920 6 Sheets-Sheet 5

Inventor:
Edgar A. Terrell
by Chas. F. Randall
Attorney

April 28, 1925. Re. 16,056

E. A. TERRELL

BOBBIN CLEANER

Original Filed Dec. 18, 1920 6 Sheets-Sheet 6

Inventor:
Edgar A. Terrell
by Chas. T. Randall
Attorney

Reissued Apr. 28, 1925. Re. 16,056

UNITED STATES PATENT OFFICE.

EDGAR ALLEN TERRELL, OF CHARLOTTE, NORTH CAROLINA, ASSIGNOR TO THE TERRELL MACHINE COMPANY, OF CHARLOTTE, NORTH CAROLINA, A CORPORATION OF NORTH CAROLINA.

BOBBIN CLEANER.

Original No. 1,451,239, dated April 10, 1923, Serial No. 431,756, filed December 18, 1920. Application for reissue filed March 14, 1925. Serial No. 15,656.

*To all whom it may concern:*

Be it known that I, EDGAR ALLEN TERRELL, a citizen of the United States, residing at Charlotte, in the county of Mecklenburg and State of North Carolina, have invented certain new and useful Improvements in Bobbin Cleaners, of which the following is a full and clear specification.

This invention relates to machines for removing the tail-ends of yarn, etc. from spent bobbins. Heretofore this has been done either by (1) unwinding, or (2) pulling or pushing the windings off the tapered end of the bobbin, or (3) severing the wrappings of the yarn at one point on a line approximately with the axis of the bobbin. Each one of these methods has its defects, especially where used for stripping the softer yarns that are used on the bobbins employed in certain spinning and twisting and roving operations. It is the object of my invention to provide a machine which will expeditiously carry out the operation of removing the yarn from the bobbin by a delinting method, so as not only to avoid injuring the bobbin but also to remove the yarn in the form of lint instead of in a string or strings, whereby the removed yarn is in much better condition for reworking in various ways.

In the drawings—

Fig. 1 is a perspective view with the lint-box partly broken away.

Fig. 2 is a detail sectional view of a part of the lint-box.

Fig. 3 is a detail plan of a part of the bobbin-conveyor.

Fig. 4 is a perspective view of the same.

Figure 11:
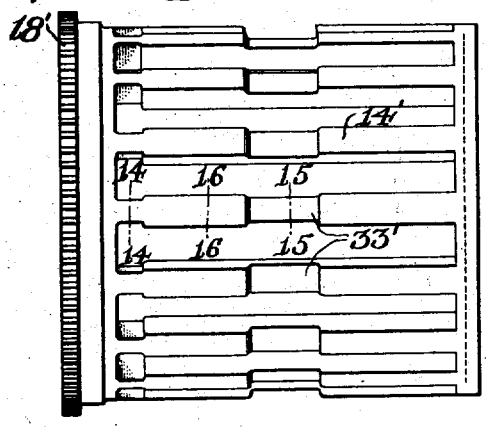
Fig. 11 is a detail view of the rotary bobbin-conveyor.
Figure 14:
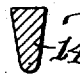
Figure 15:
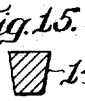
Figure 16:
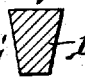

Figs. 14, 15, and 16 are cross-sections taken on the corresponding lines of Fig. 11.

Referring to the drawings annexed by reference numerals. 10 designates a pair of flexible belts which together with spaced connecting-bars 11 constitute an endless rotary carrier for the bobbins 12 to be cleaned, the space between each pair of bars being wide enough to receive loosely a bobbin, suitable flanges 13 being provided for holding the bobbins against endwise displacement, and the ends of the bars 11 being notched at 14 to receive the flanges of the bobbins, so that in passing through the machine the bobbins will be held in proper relation to the lint-removing means and at the same time will be free to rotate each within its pocket.

The belts 10 are carried by two sets of belt-wheels 15 and 16, the latter being considerably larger than the wheels 15. The belts are driven in the direction of the arrow shown in Fig. 5 by mechanism hereinafter described. The conveyor is enclosed by a stationary casing 17 shaped to enclose the conveyor and yet permit the conveyor to move freely within it. The casing is provided on its upper side with a slot or opening through which the bobbins are placed within the conveyor as it moves toward the larger end of the machine, and the bottom of the casing is provided with an opening or slot out through which the cleaned bobbins fall. The bobbins may be fed to the conveyor one by one by hand or by a suitable feeding hopper such as shown in Linder Patent No. 1,273,075, dated July 16, 1918, the discharge-chute of which is shown at 18 in Fig. 5.

On a shaft 19 extending through the larger end of the casing is affixed a roll 20 which is provided on its face with a multiplicity of flexible teeth such as used in card-clothing, the teeth being attached to the roll preferably by fastening the card-clothing to the surface of the roll. This carding-roll 20 is rotated rapidly with respect to the bobbin-conveyor by means of a belt-wheel 21 affixed to one end of the shaft and a crossed belt 22 connecting said belt-wheel 21 to a smaller belt-wheel 23 affixed to the end of the shaft 24 extending through the casing about midway its length at a point behind the roll 20, this shaft 24 being extended out through the opposite side of the casing and being provided with a belt-wheel 25 on said extended end, which belt-wheel is connected by a belt 26 to any suitable motor power. The shaft 24 is provided with a comb-roll 27 whose flexible teeth engage the ends of the flexible teeth on the delinting-roll 20 and remove the lint therefrom, the surface speed of the comb-roll being of course greater than the surface speed of the delinting-roll 20.

The comb-roll is mounted within a suction-chamber 28 arranged inside of the main casing and immediately behind the delinting-roll 20, this suction-chamber being at all times in communication with the inlet 29 of a fan 30 whose fan-legs are mounted on the aforesaid shaft 24 so that during the entire operation of the machine a suction action will be maintained on chamber 28. The upper side of the suction-chamber is inclined upwardly and rearwardly so as to form a support for the ingoing side of the endless carrier and also for the bobbins after they are placed on the carrier and before they reach the delinting-roll.

The shaft 19 is extended through the casing at the opposite side from the belt-wheel 21 and is provided with a worm 31 which meshes with a worm-gear 32 affixed to a shaft 33, which shaft drives, by means of bevel-gears 34, a shaft 35. This shaft 35 is provided with gears 36 which mesh with gears 37 carried by the belt-wheels 16. In this way, the two belt-wheels 16 are driven slowly, in unison, from the shaft 19, which in turn, as pointed out, receives its power from the combined fan and comb-roll-shaft 24. The belt-wheels 16 are not mounted on a shaft, but on the contrary are journaled in flanged angular rings 38 affixed to the respective side walls of the main casing.

To lightly press the bobbins against the rapidly-traveling teeth on the carding-belt, on roll 20, I employ a flexible strap 39 which resiliently bears upon a plurality of the bobbins while they are being stripped by the teeth of the belt. This flexible strap 39 lies in depressions formed in the separator-bars 11, these depressions being provided principally to enable the flexible strap to bear directly upon the peripheries of the bobbins while they are in contact with the carding teeth. The lower end 40 of this flexible strap extends out through a hole in the casing and is anchored to the exterior thereof, while the upper end of this belt is fastened to the periphery of the wheel 41 whose shaft is journaled in a small dome 42 affixed to the casing 17. A coil-spring 43 is connected to a projecting end of the shaft of the wheel 41 so as to normally turn the said wheel in the direction of the arrow shown in Fig. 5, that is, over toward the right, thereby maintaining a tension on the pressure-strap. Any suitable means may be employed for increasing or lessening the tension on the strap by adjustment of the position of the wheel 41, as is obvious.

As the bobbins are carried bodily along under the strap 39, the carding teeth engage the yarn thereon and rapidly and completely pick the yarn off the bobbins in the manner of the well-known carding or picking action. The engagement of the teeth into the yarn rotates the bobbins on their axes, but too rapid revolution of the bobbins is prevented by the friction engendered by the flexible pressure-strip, so that by the time the bobbin has traversed the effective length of the carding-belt it has rotated (preferably with a surface speed slightly less than the surface speed of roll 20) one or more times and has thus given the belt an opportunity to completely pick off all the yarn. The comb-roll 27 continuously combs the lint from the carding-belt, and the fan maintains a continuous suction out of the lint-chamber 28, whereby the lint that is combed off the belt is continuously removed from the lint-chamber.

The outlet-pipe 44 of the fan extends down through a hole in the top of the collecting-box or chamber 45. This depending discharge-tube 44 extends through a screen 46 extending across the top of the casing 45, so as to discharge the lint into the casing at a point below this screen. The spent air passes back up through the screen 46 and out laterally through another screen 47, this latter screen being for the purpose of catching whatever fine particles of lint the main screen 46 allows to escape.

Figure 5:
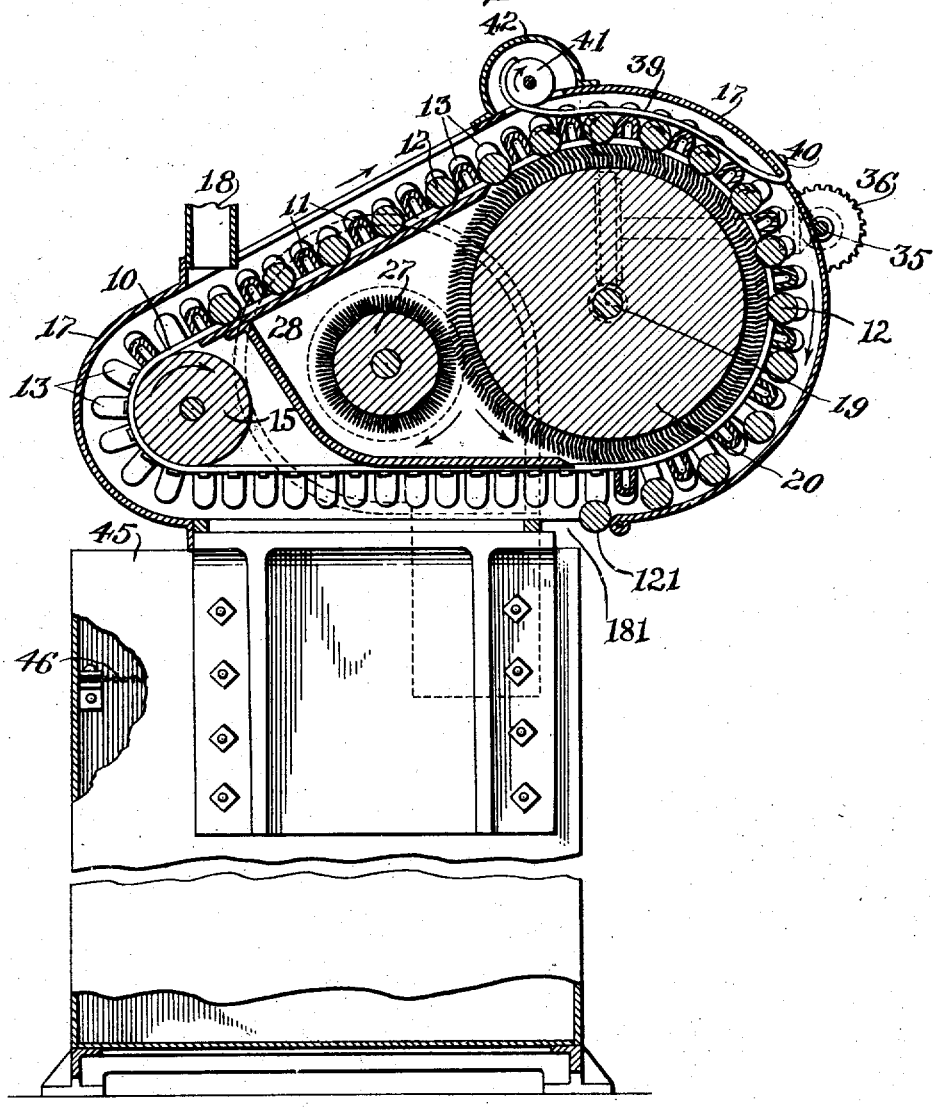
Fig. 5 is a vertical sectional view of the machine, the parts being in side elevation.
Figures 6, 7:
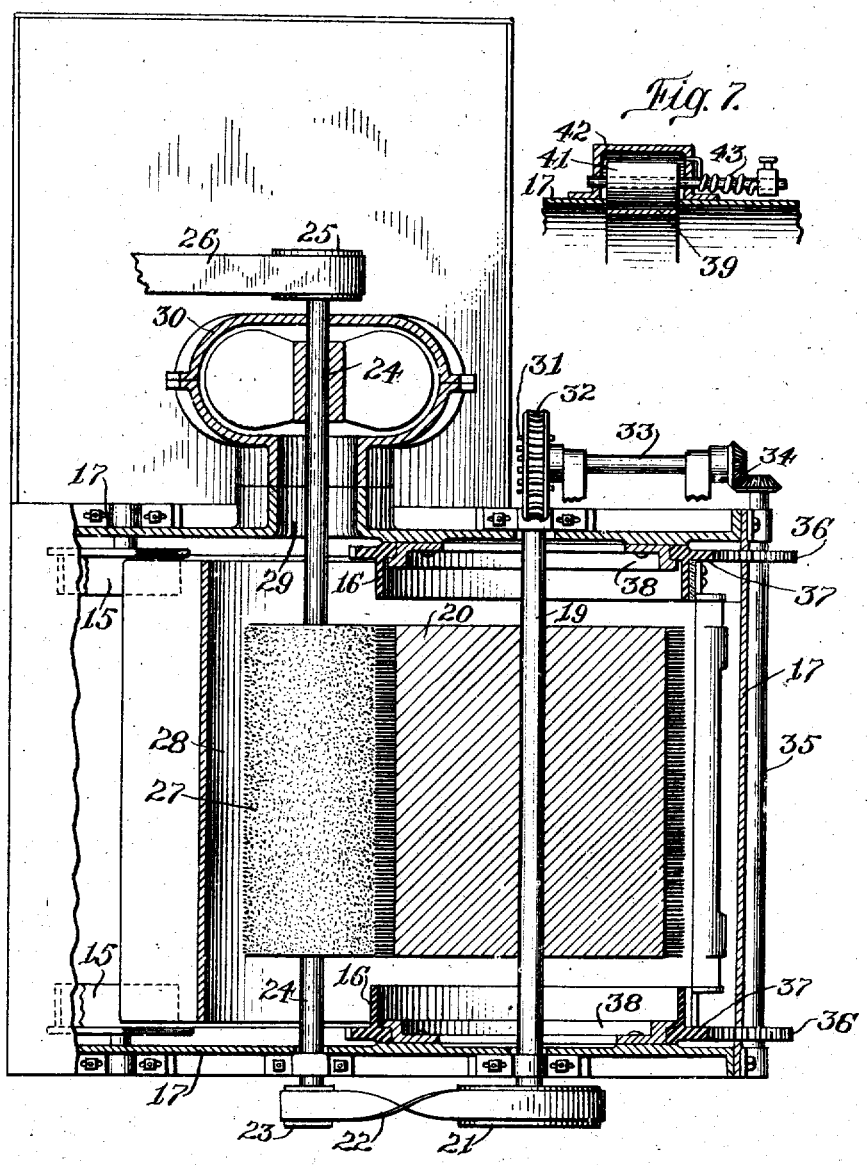
Fig. 6 is a view partly in plan and partly in horizontal section of the machine.
Fig. 7 is a detail view of the tightening device of the elastic presser.
Figure 8:
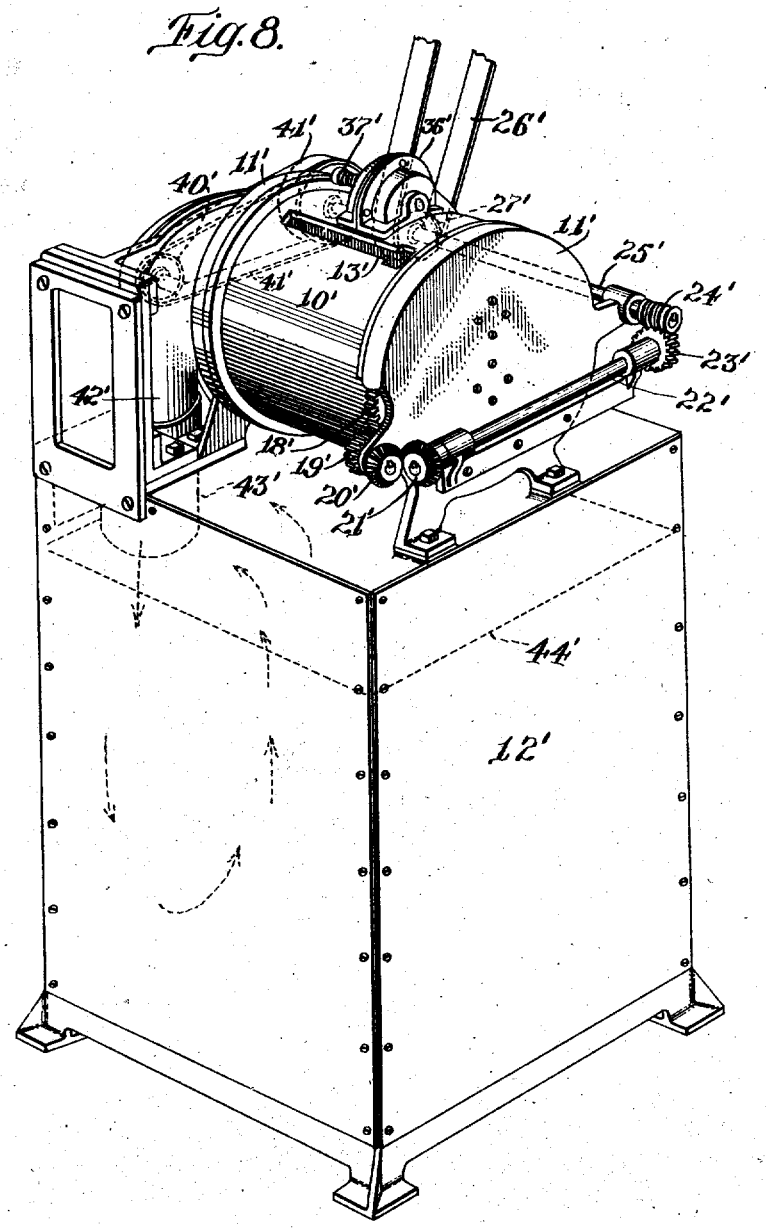
Fig. 8 is a perspective view of a modification of my machine, showing the air currents in the lint-box.

It will be understood that the working position of the carding-belt is such that when the bobbins pass off the inclined support, i. e., top wall of the suction-chamber, they will then ride upon the teeth of the carding-belt and maintain contact therewith approximately quarter around the same, after which, as shown in Fig. 5, they are permitted to gravitate away from the carding-belt and rest upon the interior of the wall of the rounded end of the casing until they reach the discharge slot in the bottom of the casing. In Fig. 5, the carding cylinder is shown as moving in a direction opposite to that of the endless carrier, but it will be understood that the bobbins may be delinted by running the carding surface in the same direction as the carrier.

Referring to the drawings of the modified form of the machine, 10′ designates a cylindrical casing arranged in a horizontal position and closed at both ends by means of heads 11′ which are rigidly affixed to the top of the casing 12′. The cylindrical part 10′ is provided with a longitudinal slot 13′ in through which the bobbins are dropped one by one in the act of feeding them to the machine. They may be dropped into this slot 13′ by hand or from a hopper as may be desired.

As the bobbins drop through slot 13′ they fall between longitudinal bars 14′ of a conveyor and rest upon the outer surface of a stationary cylinder 15′ which forms the suction-chamber and is mounted concentrically within the casing 10′. This cylindrical suction-chamber forms a guide and support for the bobbin and has its ends rigidly bolted to the casing-heads 11′, and it is provided adjacent said heads 11′ with an annular radial flange 16′ at each end, which flanges form journals for a pair of rotatable rings 17′ which carry the separating and conveying bars 14′, whereby the cage-like conveyor consisting of said bars 14′ and said rings 17′ rotate on said flanges 16′ concentrically in the casing. This rotary conveyor is driven by means of the gear 18′ carried by one of the rings 17′, which gear meshes with a pinion 19′ affixed to a short shaft journaled in the adjacent one of the heads 11′ carrying the bevel-gear 20′. This bevel-gear 20′ meshes with a companion bevel-gear 21′ affixed to a shaft 22′ journaled on said head and carrying at its opposite end a worm-gear 23′. Meshing with the gear 23′ is a worm 24′ affixed to a drive-shaft 25′, which shaft receives the power from an engine or motor through the medium of the belt 26′ and a driven pulley 27′.

Figure 9:
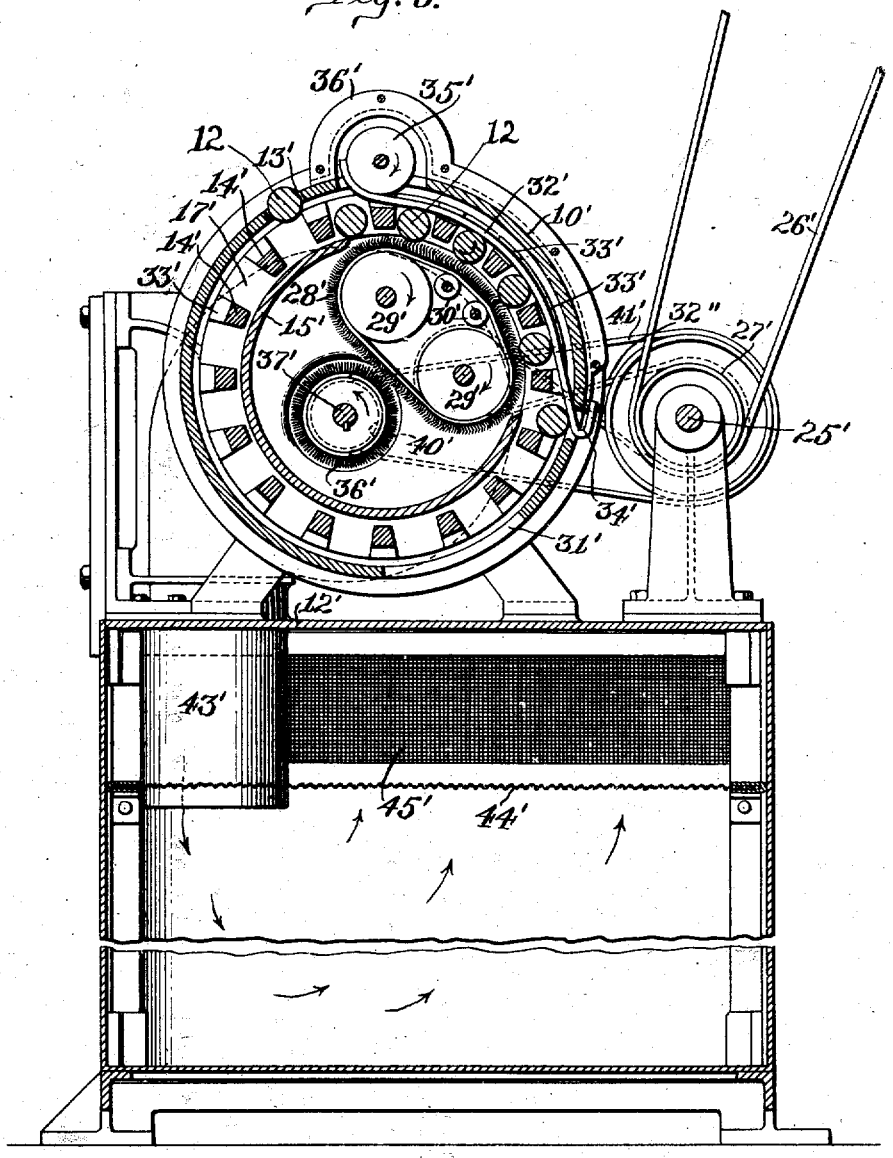
Fig. 9 is a vertical sectional view in side elevation.
Figure 10:
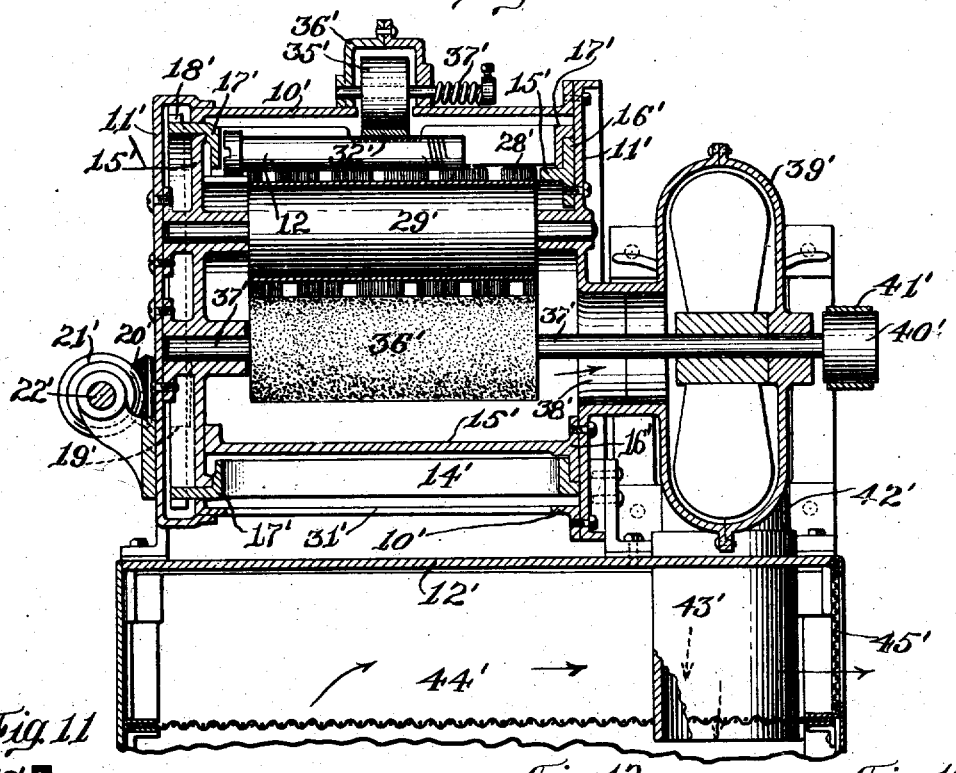
Fig. 10 is a cross section seen from the left of Fig. 9, omitting the lower portion of the lint-box.

At the rear, upper, side of the casing 15′ this casing is open for a portion of its circumference, and projecting through this opening is the working-section of an endless belt 28′ of card-clothing of the usual kind. This carding-belt runs on a pair of rolls 29′ whose shafts are journaled at one end in the head 11′ and at their other ends in bearings carried by the casing-head. To insure the working-side of the carding-belt being maintained in the general path of movement of the bobbins in the carrier, I provide a pair of small idle rolls 30′ suitably journaled in the casing-heads. The gearing above described will drive the bobbin-carrier over toward the right, as viewed in Fig. 9, and suitable driving mechanism is provided for driving the carding-belt in the same direction, but at a much greater speed. The position of the working side of the carding-belt is such that when the bobbins pass off the external surface of the stationary cylinder 15′ they will ride upon the teeth of the carding-belt and maintain co-action therewith during approximately a quarter distance around the casing, after which, as shown in Fig. 9, they are permitted to gravitate away from the carding-belt and rest upon the interior of the wall of the cylinder 10′ until they reach the discharge-slot 31′ formed in the lower part thereof.

To lightly press the bobbins against the rapidly-traveling teeth of the carding-belt, I employ a flexible strap 32′ which resiliently bears upon a plurality of the bobbins while they are being stripped by the teeth of the belt. This flexible strap 32′ lies in notches 33′ formed in the separator-bars 14′, these notches being provided principally to enable the flexible strap to bear directly upon the peripheries of the bobbins while they are in contact with the carding-teeth. The lower end 34′ of this flexible strap 32′ extends out through a hole in the casing and is anchored to the exterior thereof, and the upper end of this belt is fastened to the periphery of a wheel 35′ whose shaft is journaled in a small dome 36′ affixed to the casing cylinder 10′. A coil-spring 37′ is connected to a projecting end of the shaft of the wheel 35′ so as to normally turn said wheel in the direction of the arrow shown in Fig. 9, that is, over toward the right, thereby maintaining a desirable tension on the pressure-strap 32′. Any suitable means may be provided for increasing or lessening the tension on the strap by adjustment of the position of the wheel 35′, as is obvious.

As the bobbins are carried bodily along under the strap 32′, the carding-teeth engage the yarn thereon and rapidly and completely pick the yarn off the bobbin in the manner of the well-known carding or picking action. The engagement of the teeth into the yarn rotates the bobbins on their axes, but too rapid revolution of the bobbins is prevented by the friction engendered by the flexible pressure-strap 32′, so that by the time the bobbin has traversed the length of the carding-belt it has slowly rotated one or more times and has thus given the belt an opportunity to completely pick off all the yarn. Continuously-operating means must be provided for combing the lint from the carding-belt. To perform this function, I arrange within the suction-chamber 15′ a comb-roll 36′ whose axis is parallel with the surface of the carding-belt and whose teeth engage the teeth of the carding-belt in a well-known manner. This comb-roll is rotated by means of a shaft 37′ journaled at one end in one of the suction-chamber heads 15′ and whose opposite end extends out through an exit-passage 38′ formed in the opposite head 11′. This projecting end of the shaft 37′ is journaled on the outer wall of a fan-casing 39′, and at a point beyond the fan-casing the shaft is provided with a belt-pulley 40′ which is driven by a belt 41′ from the drive-shaft 25′. A fan is affixed to the shaft 37′, and the inlet of the fan-casing is connected to the aforesaid outlet 38′ of the lint-chamber, whereby shaft 37′ not only drives the comb-roll but will drive the fan and thus maintain a continuous suction out of the lint-chamber, whereby the lint that is combed off the belt by the comb-roll is continuously removed from the lint-chamber.

The outlet-conduit 42′ of the fan extends downwardly into a tube 43′ extending up through the top wall of the casing 12′. This depending discharge-tube 43′ extends through a screen 44′ extending across the top of the casing so as to discharge the lint into the casing at a point below this screen. The spent air passes back up through the screen 44′ and out laterally through another screen 45′, this latter screen being for the purpose of catching whatever fine particles of lint the main screen 44′ allows to escape.

Figure 12:
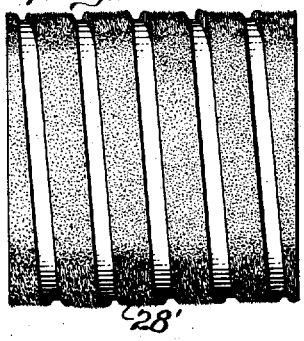
Figs. 12 and 13 are side and end views, respectively, of the card clothing belt which strips the bobbins.
Figure 13:
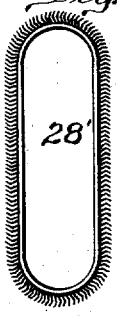

In practice, it may be desirable to so arrange the apparatus that the carding-teeth on the cleaning belt shall strike the yarn-windings at a slightly oblique angle to the axis of the bobbin so as to thereby cause the teeth to more effectively engage into the fibers of the yarn than would be the case if the teeth traversed a path parallel or approximately parallel with the yarn-windings. To accomplish this, I may arrange the teeth of the carding-belt in a spiral zone or path, as shown particularly in Fig. 12, a spiral untoothed zone being provided between the coils of teeth. Another way (not shown) of thus attacking the yarn-windings obliquely is to arrange the separating-bars 14′ in a slightly oblique position with reference to the axis of rotation, so that they will be maintained in an oblique position with reference to the carding-belt during the time the belt is in action. When this arrangement is used, the entrance-slot 13′ should be correspondingly inclined.

The driving mechanism for the belt 28′ may be a belt 32″ connecting a pulley on the drive-shaft 25′ with a pulley on the shaft of one of the rolls 29′.

The nature and scope of the invention having been thus indicated and its preferred embodiment having been specifically described, what is claimed as new is:

1. In a bobbin-stripping machine, a delinting device having a curved surface of flexible teeth, means for driving the same, an endless carrier passing around said surface and having compartments for carrying the bobbins, a flexible pressure-device engaging a plurality of the bobbins as they pass around said curved surface to press them lightly against the teeth carried thereby, whereby the bobbins are caused to rotate and the waste yarn delinted therefrom, and means for continuously driving the carrier.

2. In a machine of the class set forth, a rotary carrier and means for slowly driving it, a delinting appliance within the carrier and means for driving it at a rate faster than the carrier, and flexible means for pressing the bobbins while in the carrier against the flexible teeth of the delinting appliance for the purpose set forth.

3. In a machine of the class set forth, a casing provided with an entrance-slot and also an exit or discharge-slot, a carrier rotatively mounted within the casing and means for slowly driving it, an inner stationary lint-chamber, means for delinting the bobbins and depositing the lint in said chamber, and means for removing the lint from said chamber by air suction.

4. In a machine of the class set forth, a rotary carrier, a delinting toothed appliance located within the carrier, an external flexible pressure-strap, and spring means for holding said strap taut against the bobbins during the delinting action.

5. In an apparatus of the class set forth, an endless-belt-carrier carrying a series of bobbin-spacing transverse bars, wheels for carrying said belt and means for driving said wheels, an endless yarn-picking appliance within said carrier, a suction-chamber, means for supporting the bobbins until they pass onto the teeth of said yarn-picking appliance, means for holding the bobbins in engagement with said teeth for a predetermined period, and means for removing the lint from said appliance and exhausting it from said suction-chamber.

6. In a machine for stripping waste yarn from bobbins, a rotary delinting appliance provided with flexible delinting teeth, means for rotating the same, an endless carrier moving in a path concentric with the delinting appliance and constructed to provide individual pockets for the bobbins, means for continuously driving the carrier, flexible means for pressing a plurality of the bobbins lightly into contact with the ends of the teeth during the delinting process, whereby the engagement of the yarn with the teeth will cause the bobbins to rotate while in contact with the teeth, and means for combing the lint from the teeth of the delinting appliance.

7. In a machine for removing the waste yarn from bobbins, a casing, a rotary toothed delinting appliance within the casing, a suction-chamber located at one side of the delinting appliance and enclosing a combing appliance, suction-means connected to said suction-chamber, an endless carrier within the casing arranged to move the bobbins along on the upper wall of the suction-chamber, said wall terminating adjacent to the active portion of the delinting appliance so as to deliver the bobbins directly onto the teeth of the delinting appliance and allow them to rest thereon, said carrier being arranged to move the bobbins in succession around the active surface of the delinting appliance, whereby a plural number of the bobbins are being operated on at the same time.

8. In a machine for removing waste yarn from bobbins, a casing, a toothed rotary delinting appliance, a carrier adapted to move the bobbins in succession to a position so that they are supported on the teeth of said appliance and maintain them in contact therewith during a portion of their travel, said carrier being constructed of endless belts and separated bars, these bars being provided with depressions in their outer edges and a flexible strap-member lying in said depression, and resilient means for holding said strap-member taut so as to press against the bobbins while they are being delinted and to hold them resiliently against the teeth of the delinting appliance.

9. In a machine for removing waste yarn from bobbins, means for removing the yarn in the form of lint, suction-means for removing the lint embodying a suction-fan, a separating chamber into which extends the eduction-pipe of the fan, a screen arranged across the chamber at a point between the exit-end of the eduction-pipe and the adjacent wall of the chamber, and a screened outlet for the chamber communicating with the space between the screen and said adjacent wall of the chamber.

10. In a bobbin-stripping machine, a delinting device having a toothed surface, means for driving the same, and a traveling endless carrier having compartments occupied by bobbins having their axes disposed transversely with respect to the direction of movement, whereby the bobbins are caused to rotate within such compartments and the waste yarn is delinted therefrom.

11. In a bobbin-stripping machine, a delinting device having a toothed surface, means for driving the same, a traveling carrier having compartments occupied by bobbins having their axes disposed transversely with respect to the direction of movement, and means whereby a bobbin being stripped is borne yieldingly against the said toothed surface, whereby the bobbins are caused to rotate within such compartments and the waste yarn is delinted therefrom.

12. In a bobbin-stripping machine, a delinting device having a toothed surface, means for driving the same, and a traveling carrier passing around the said surface and having compartments occupied by bobbins having their axes disposed transversely with respect to the direction of movement whereby the bobbins are caused to rotate within such compartments and the waste yarn is delinted therefrom.

13. In a bobbin-stripping machine, a delinting device having a toothed surface, means for driving the same, a traveling carrier passing around the said surface and having compartments occupied by bobbins having their axes disposed transversely with respect to the direction of movement, and means whereby a bobbin being stripped is borne yieldingly against the said toothed surface, whereby the bobbins are caused to rotate within such compartments and the waste yarn is delinted therefrom.

14. In a bobbin-stripping machine, a delinting device having a toothed surface, means for driving the same, a traveling carrier with which bobbins are rotatably combined for the stripping operation, and presser-means by which a bobbin is held yieldingly toward the toothed surface and its revolution upon its own axis is controlled.

EDGAR ALLEN TERRELL.